Jan. 7, 1930. W. B. BETTS 1,742,377
RECORDING AND BILLING ATTACHMENT FOR METERS
Filed April 2, 1926 3 Sheets-Sheet 3
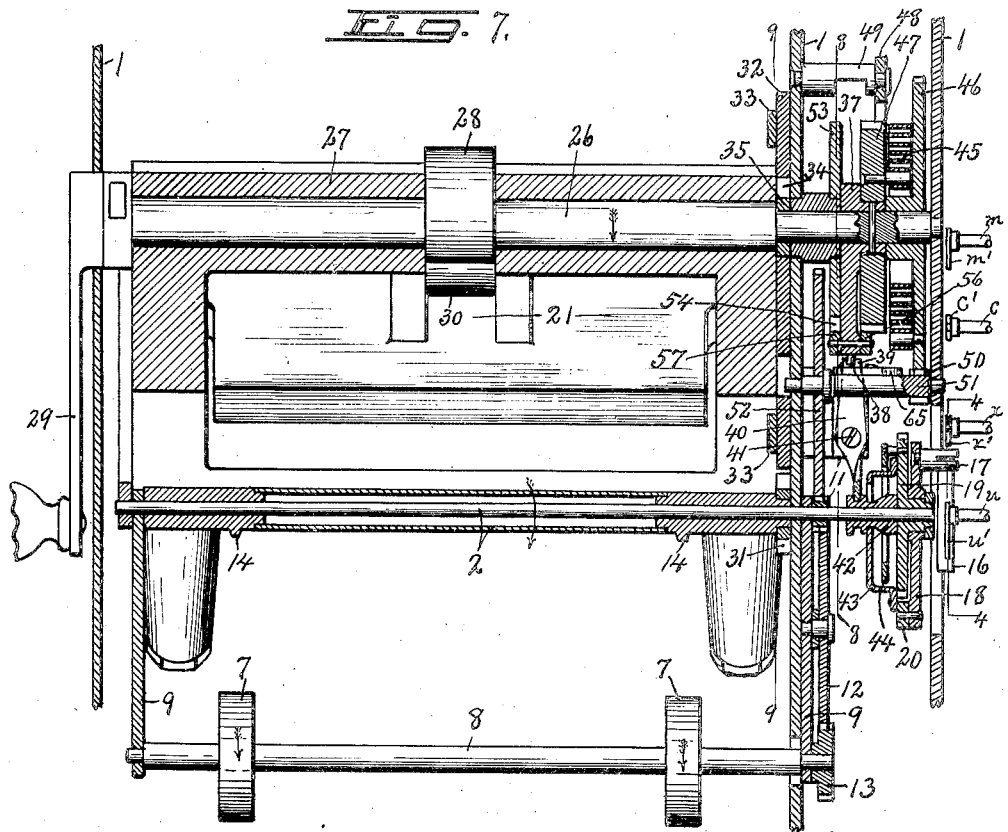
FIG. 7.
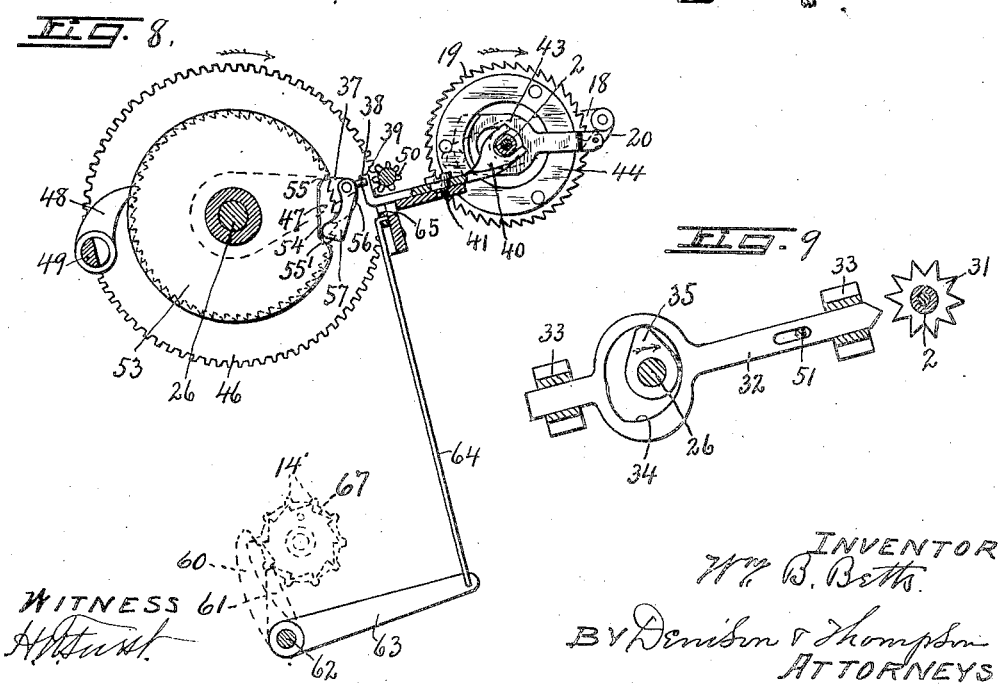
FIG. 8.
FIG. 9.
INVENTOR
Wm. B. Betts
BY Denison & Thompson
ATTORNEYS
WITNESS Patented Jan. 7, 1930

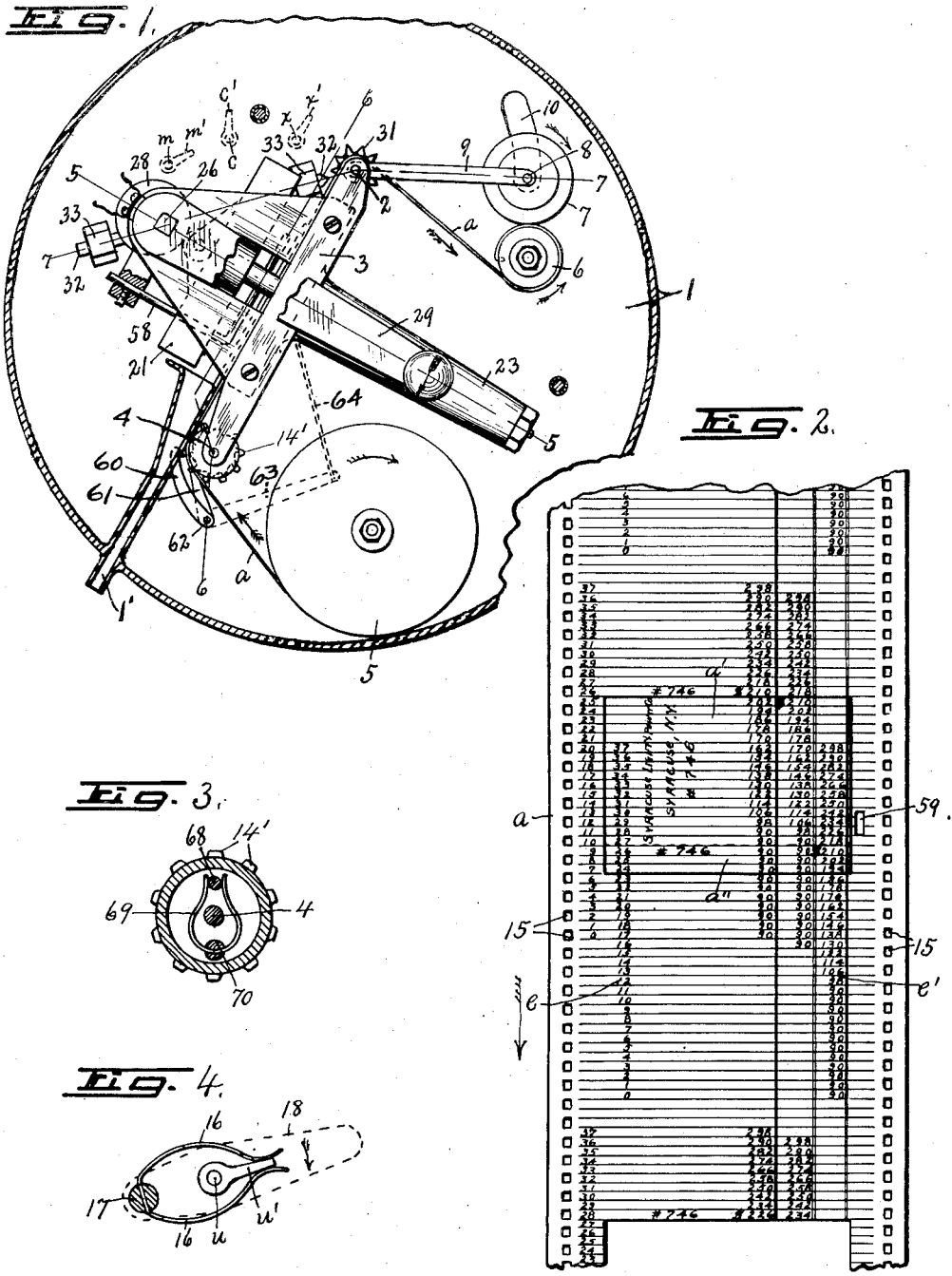

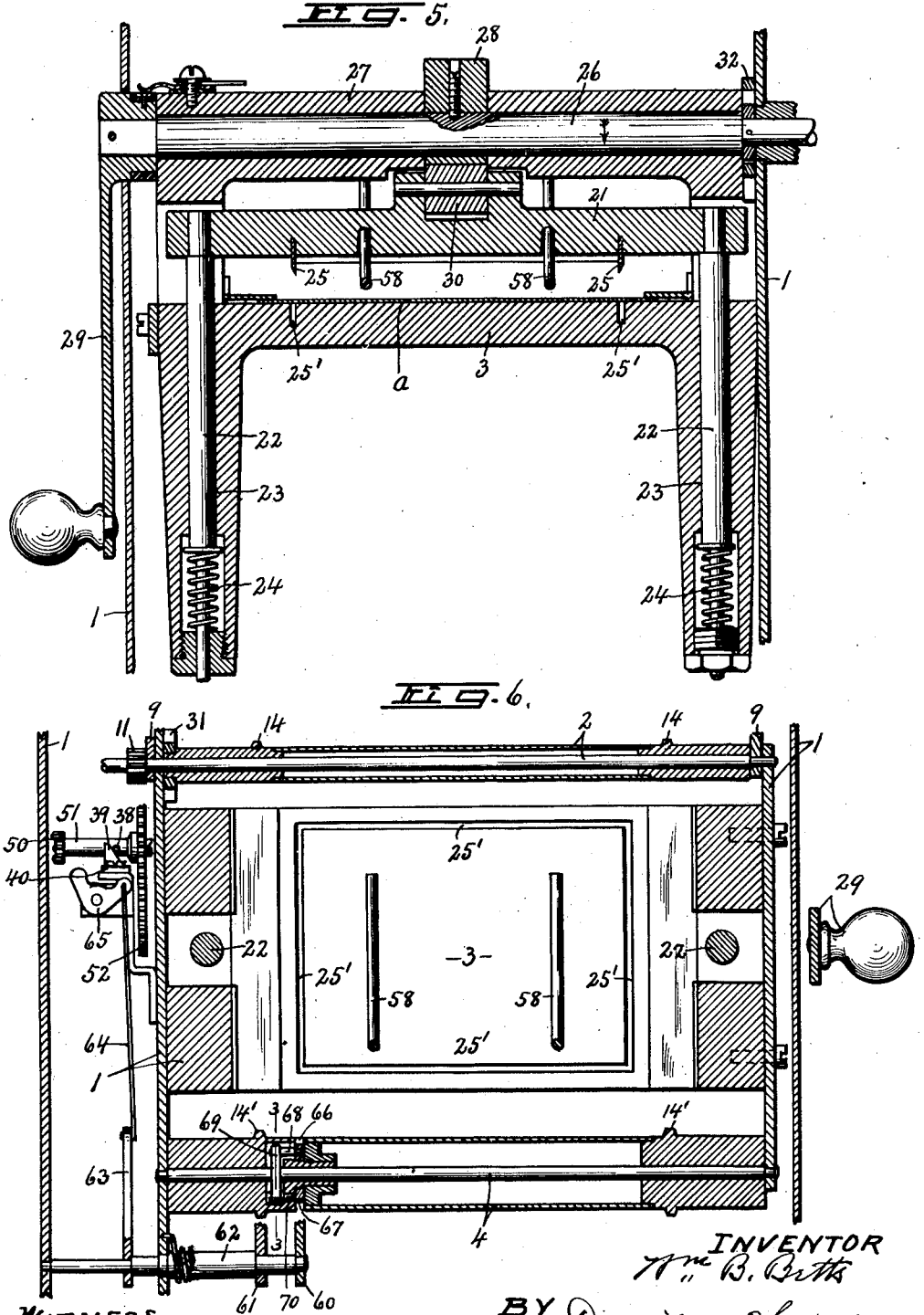

1,742,377

UNITED STATES PATENT OFFICE

WILLIAM B. BETTS, OF JOHNSON CITY, NEW YORK

RECORDING AND BILLING ATTACHMENT FOR METERS

Application filed April 2, 1926. Serial No. 99,429.

This invention relates to a recording and billing attachment for meters such as are commonly used for measuring the quantity of electric current, gas, water or other fluent which may be served to patrons at a stipulated price per unit of measurement or on a time period basis or both.

For example, it is customary for public service corporations, supplying electric or gas light and heat and water to various consumers, to render periodic or monthly bills to the consumers based upon the quantity of the particular element consumed during each of those periods and, in view of the large number of consumers usually subscribing for either or all of said services and the necessarily complicated system of bookkeeping arising therefrom, it is inevitable that many complaints and criticisms, mostly arising from misunderstanding or errors in reading the meters, are frequently presented from one side or the other of the parties to the transactions.

The main object of the present invention is to greatly simplify the method of recording and billing of the meter readings and prices of the dispensed element passing through the meter to a subscribing consumer and thereby to eliminate a large part of the complaints and criticisms between the service corporations and the consumers.

Another object is to provide the attachment with means for producing a triplicate record of the meter readings and prices, one to remain in the machine, another to be given to the patron as a receipt upon payment of the bill, and a third to be placed in the files of the service corporation.

A further object is to reduce the time and labor required for obtaining the information from the meters necessary to render the bills at more or less regular time periods.

Other objects and uses relating to specific parts of the device will be brought out in the following description.

In the drawings:

Figure 1 is a top plan, partly broken away and partly in section of the larger portion of a recording and billing attachment embodying various parts of the invention as an attachment for electric meters, portions of which are indicated by dotted lines.

Figure 2 is a plan of a portion of the sheet or web upon which electric meter readings and prices are recorded and from which the bills are served at more or less regular intervals of time.

Figure 3 is an enlarged transverse sectional view of one of the supporting drums for the record sheet taken in the plane of line 3—3, Figure 6.

Figure 4 is an enlarged end view, partly in section, of the driving connection between the unit spindle of the meter and one of the supporting drums for the record sheet, taken in the plane of line 4—4, Figure 7.

Figure 5 is an enlarged sectional view taken in the plane of line 5—5, Figure 1, showing more particularly the impression making and bill cutting mechanism.

Figure 6 is an enlarged longitudinal sectional view of a portion of the same device taken on line 6—6, Figure 1.

Figure 7 is an enlarged sectional view taken on line 7—7, Figure 1.

Figure 8 is a transverse sectional view taken in the plane of line 8—8, Figure 7.

Figure 9 is a transverse sectional view taken in the plane of line 9—9, Figure 7.

The device shown is adapted to be used as an attachment for electric meters having the usual registering spindles —$u$—, —$x$—, —$c$— and —$m$— and corresponding pointers —$u'$—, —$x'$—, —$c'$— and —$m'$— as shown by dotted lines in Figure 1 and by full lines in Figure 7 for indicating, in this instance, units, tens, hundreds and thousands of kilowatts, commonly accepted as a basis for charges to consumers.

The various mechanisms used in the attachment are mounted within or upon a supporting frame or housing —1— so as to constitute a unitary article of manufacture adapted to be supported upon or in proximity to the dial side of the meter in such manner that the primary actuator of the paper feeding device may be conveniently and as nearly as possible directly connected to the unit spindle of the meter for receiving motion therefrom as shown more clearly in Figure 7 in which the primary actuator for the record sheet, comprising a rotary drum —2—, is journaled in the frame —1— co-axial with the unit spindle —u— with one end in relatively close proximity to said spindle.

The drum —2— is journaled upon the upper end of a vertically inclined platen —3— (Figure 1) which forms a part of the main supporting frame and across which a record sheet as —a— is adapted to be drawn by the rotation of the drum —2—.

An additional drum —4— is journaled upon the lower end of the platen —3— for receiving and supporting the adjacent portion of the record sheet —a—, the face of the platen adjacent the record sheet being substantially flat while the corresponding faces of the drums —2— and —4— are disposed in a plane substantially parallel with and in proximity to the flat face of the platen to permit certain characters to be embossed or otherwise impressed upon the portion of the tape between the drums in a manner and for purposes hereinafter described.

The record sheet —a— is attached at one end to and is normally wound upon a carrier reel —5— and has its other end attached to a take-up reel —6—, both of said reels being preferably located at the base of the platen directly opposite the ends and in spaced relation lengthwise thereof with their axes parallel with the corresponding drums —4— and —2— for compactness and ease of operation of the record sheet.

A pair of pressure rolls —7— are mounted co-axially upon a supporting shaft —8— having its ends journaled in transversely spaced arms —9— which are pivotally mounted upon the supporting frame co-axial with and preferably upon the ends of the drum —2—.

The shaft —8— carrying the pressure rollers —7— is journaled upon the free ends of the arms —9— directly over the reel —6— so that the rollers may gravitate against the periphery of said roll for operating the reel —6— to take up the slack of the record sheet between said reel and the drum —2—, it being understood that the arms —9— carrying the pressure rolls are movable vertically to conform to the varying thicknesses of the record sheet upon the take-up reel and in order to permit this vertical movement one side of the frame through which the shaft —8— extends is provided with a slot —10— concentric with the axis of the drum —2—, Figure 1.

The drum —2— is provided near one end with a pinion —11— meshing with a relatively larger gear —12— which is journaled upon the frame —1— as shown in Figure 7 and engages relatively smaller gear —13— on the corresponding end of the shaft —8—, the gears —11—, —12—, and —13— being proportioned so as to rotate the pressure rolls —7— at a slightly greater speed than the feed of the record sheet —a— to assure by its frictional engagement with the paper on the reel —6— the desired tensioning of the sheet as it leaves the drum —2—.

These drums —2— and —4— are provided with peripheral sprocket wheels —14— and —14'— (Fig. 6) in axially spaced relation somewhat less than the width of the sheet —a— for engaging in lengthwise rows of apertures —15— in the opposite longitudinal edges of the sheet, Figure 2, for positively feeding the sheet across the face of the platen —3—.

The unit spindle —u— is resiliently connected to the adjacent end of the drum —2— by a pair of opposed spring arms —16—, Figures 4 and 7, engaged with opposite ends of the pointer —u'— and secured to a post —17— which is eccentrically secured to a rotary crank arm —18— co-axial with the drum —2— and unit spindle —u—.

This crank arm —18— is loosely journaled on the hub of a ratchet wheel —19—, Figures 7 and 8, and carries a pawl —20— at one side of its axis opposite the stud —17— for engagement with the teeth of the ratchet wheel —19— which is secured to the adjacent end of the drum —2— to rotate therewith.

The unit spindle of the meter is, of course, actuated only when current is passing through the meter according to the demand of the user and under normal operation the pawl —20— will be engaged with the teeth of the ratchet wheel —19— under which conditions the rotation of the unit spindle —u— will be transmitted through the spring arm —16— to the crank arm —18— at the same speed, and this rotation of the crank arm will transmit rotary motion to the ratchet wheel —19— through the pawl —20— for rotating the drum in the same direction as the meter spindle —u—, the object of the spring arms —16— being to relieve the meter from sudden shock by gradually overcoming the inertia of the feeding drum and its operating mechanism and permit slight relative rotation of the drum 2.

This clockwise rotation of the drum —2— by the meter, or in the direction indicated by the arrows, Figures 1, 7 and 8, serves to feed the record sheet —a— endwise in the direction indicated by the arrow, Figures 1 and 2, at a rate of speed proportionate to the speed of the meter and therefore the linear feed of the sheet across the platen will corresponding to the amount of current or number of kilowatts actually passing through the meter for service to the patron.

It, therefore, follows that the record sheet will be fed lengthwise a definite distance for each complete revolution of the unit spindle —u— and feeding drum —2— representing in this instance ten kilowatts and inasmuch as the sheet continues to move as long as the meter is operating the sheet is preferably provided with transverse parallel lines in uniformly spaced relation lengthwise thereof so that each space between the lines may represent the unit of measurement, in this instance a kilowatt.

Under these conditions the line spaces are numbered in sequence from a starting point lengthwise from zero upward such as naught, one, two, three and so on so that the number registering with a fixed index at the starting point will indicate the actual number of units of measurement or kilowatts passing through the meter and inasmuch as the charges for the service are based upon the number of kilowatts passing through the meter, in this instance 8¢ per kw., it is evident that the price of any total number of kilowatts consumed as indicated on the sheets might be placed opposite that total.

It is customary, however, for the service companies to establish a minimum flat price for all current consumed below a certain minimum in this instance 90¢ each month for the first eleven kilowatts for that period which, of course, would be 2¢ in excess of the actual price of eleven kilowatts at 8¢ per kilowatts and this flat price is usually placed upon the sheet opposite the first eleven units for each month period while the prices marked opposite the total kilowatts for the remaining period of the month as marked upon the sheet opposite said totals will be 2¢ in excess of the actual cost of each total at the stated price per kilowatt. For example, the cost of twelve kilowatts at 8¢ will be 96¢ while the price opposite that total is marked upon the sheet as 98¢, the price of each total upon the sheet being increased by the same amount.

These lengthwise columns as —e— of totals of current consumed and prices therefor are based upon average monthly consumption of individual patrons and therefore these columns are printed in sequence along the sheet, one set of columns for each month, each column of figures representing the total number of kilowatts being numbered in this instance from zero to 37, the higher number indicating the maximum possible consumption of any patron.

Associated with each kilowatt column is a column —e'— of prices indicating the total costs of the corresponding number of kilowatts or other units of measurement.

Heretofore it has been customary for the service corporations to take the readings of their several meters near the end of each month and on the first of the following month to render bills to the individual patrons for the amount of current used according to the meter readings, all of which requires considerable time and labor and introduces a factor of unreliability leading to more or less complaint and criticism which this invention seeks to avoid.

In carrying out the objects stated, means is provided for producing a triplicate record of the number of the meter, the total meter reading and suitable indicia such as dollar marks ($) adjacent the price for the total number of kilowatts or other commodity metered to each individual patron during the interval between the making of such records, one of which remains permanently on the sheet, while the other two are detached therefrom, one to be given to the patron as a receipt for the payment of the bill and upon which the name of the company has been impressed in the operation of impressing the previously named indicia on the sheet, the remaining record being detached and retained by the company for future reference.

For this purpose the attachment is provided with a printing or embossing couple including the stationary platen —3— and a movable embossing or printing element —21— extending across the face of the platen —3— and provided with guide rods —22— Figures 5 and 6 which are movable in suitable guide openings —23— in the platen —3— against the action of retracting springs —24—, the latter being mounted in suitable enlargements in the outer ends of the guide openings —23— as shown more clearly in Figure 5.

The embossing element —21— is provided with a rectangular cutter consisting of knife blades —25— projecting beyond the printing face thereof and adapted to enter corresponding grooves —25'— in the face of the platen —3—, the inner walls of the slots forming shearing members with which the edges of the knives —25— are adapted to cooperate for severing a corresponding rectangular section as —a'— from the sheet when the printing element —21— is forced into pressing co-action with the platen.

The means for forcing the printing element —21— to its printing and cutting position comprises a shaft —26— journaled in suitable bearings —27— in the frame —1— and provided with a cam —28— tight thereon to rotate therewith.

A hand crank —29— is secured to one end of the shaft —26— for rotating the same and thereby rotating the cam —28— against a roller —30— on the central portion of the printing element —21—, the throw of the cam being sufficient to cause the face of the printing element to impinge the sheet against the platen as the shaft —26— is revolved by the hand crank —29—, the depression of the printing element also serving to force the knives —25— into their respective grooves —25'— for severing the section —a'— of the sheet therefrom.

This printing and cutting operation is performed at more or less regular intervals of, say once each month, for each patron by an employee of a service companying and during such operation it is important that the movement of the record sheet shall be temporarily suspended and that certain lines on the record sheet indicating the total quantity of the commodity used and the price of such quantity shall be exactly registered with the cutting and printing elements and for this purpose one end of the feeding drum —2— is provided with a star wheel —31— adapted to be engaged by one end of a registering and holding pawl —32— which is slidable lengthwise in guides —33— on the frame —1— transversely of the axis of the shaft —26— and is provided intermediate its ends with a cam opening —34— for receiving a cam —35— on the shaft —26— as shown in Figures 7 and 9.

The walls of the cam opening —34— and the cam —35— are relatively arranged in such manner that when the hand crank —29— and cam —28— are in their normal positions the pawl —32— will be positively withdrawn from engagement with the star wheel —31— to permit free operation of the drum and record sheet actuated thereby but immediately upon the beginning of the rotation of the shaft —26— from its normal position for effecting the cutting and printing operation the cam —35— will force the pointed end of the pawl —32— into the space between the adjacent teeth of the star wheel —31— thereby centering said teeth with the pawl and temporarily stopping the further rotation of the drum until after the printing and cutting operation is completed.

While the time required for effecting this printing and cutting operation is negligible and consequent temporary checking of the movement of the drum —2— and record sheet, suitable means is provided for disconnecting the drum from the meter to allow the latter to continue its free operation.

The shaft —26— is provided with a crank arm —37— having one end keyed thereto and its other end provided with a radial pin —38— for engaging a cam —39— on one end of a lever —40— which is pivoted at —41— to a part of the main supporting frame and has its other end engaged in an annular groove of a cone collar —42— which is slidable axially on the corresponding end of the drum —2— as shown in Figures 7 and 8.

This cam collar extends through an opening in a sliding plate —43— which is pivotally connected to the pawl —20— at one side of its pivot as shown in Figure 8 so that the rotation of the crank arm —37— from its normal or starting position will cause the pin —38— to ride against the cam —39—, thereby rocking the lever —40— about the axis of its pivot —41— for moving the cone collar —42— endwise.

The conical face of the collar —42— will then engage one of the walls of the opening in the sliding plate —43— for causing the latter to trip the pawl —20— from engagement with the ratchet wheel —19— thereby leaving the crank arm —18— free to be rotated by the driving spindle —u— of the meter, the sliding plate —43— being retained in operative position by means of a guard ring —44—, Figures 7 and 8.

This cutting and printing operation is effected by one complete rotation of the hand crank —29— and cam —28— in a clockwise direction but the normal operation of the record sheet is mainly effected through the medium of a separate motor to cooperate with the meter and to relieve said meter from excessive load.

For this latter purpose is provided a coiled spring —45— wound around the hub of a gear —46— which is loosely mounted upon one end of the shaft —26—, Figure 7, said spring having one end connected to the gear —46— and its other end connected to an adjacent co-axial ratchet wheel 47 which is loosely mounted upon the hub of the crank arm —37—.

The spring motor —45— is wound in such manner as to rotate the gear —46— in a clockwise direction and tends to rotate the ratchet wheel —47— in a counter clockwise direction but the ratchet wheel is held against such counter clockwise movement by a holding pawl or detent —48— which is pivotally mounted upon a stationary stud —49— on the frame —1— as shown in Figures 7 and 8.

The gear —46— meshes with a pinion —50— on a stub shaft —51— which is journaled in the frame —1— and carries a relatively larger gear —52— tight thereon and engaged with the pinion —11— for transmitting rotary motion to the drum —2— in a clockwise direction or in the same direction as the unit spindle —1— of the meter thereby relieving the meter from the driving load upon the drum —2— and still permitting it to rotate in unison therewith when operated by the commodity passing through the meter.

A stationary disk —53— is mounted upon the frame —1— adjacent the crank arm —37— which is interposed between said disk and the ratchet wheel —47—, said disk being provided in one side with a peripheral recess —54— forming shoulders —55— and —55'— at the ends of the recess as shown in Figure 8.

A driving pawl —56— and a controlling pawl —57— are both pivoted co-axially upon the free end of the crank arm —37—, the driving pawl —56— being adapted to engage the teeth of the ratchet wheel —47— while the controlling pawl —57— engages the periphery of the stationary disk —53— to control the operation of the driving pawl —56— into and out of engagement with the teeth of the ratchet wheel —47— as the shaft —26— is rotated by the hand crank —29— to effect a printing and cutting operation previously described.

When the shaft —26— is in its normal position of rest after each printing and cutting operation the end of the crank arm —37— carrying the pin —38— and pawls —56— and —57— will be slightly above the point of the cam —39— while the free ends of the pawls —56— and —57— will be in a position near the end wall —55— of the recess —54— so that the free end of the controlling pawl —57— will be registered with the corresponding end of the recess to permit the holding pawl —56— to engage the adjacent teeth of the ratchet wheel —47—.

Then if the shaft —26— is rotated by the hand crank —29— to effect the printing and cutting operation, the crank arm —37— will be rotated in the same direction thereby causing its pin —38— to engage the cam —39— for operating the lever —40— and slide —43— to release the pawl —20— from engagement with the ratchet wheel —19— as previously explained and at the same time the pawl —56— will engage and operate the ratchet wheel —47— until the controlling pawl —57— engages the shoulder —55'— on the disk —53— at which time the pawl —56— will be disengaged from the ratchet wheel —47—, the distance between the shoulders —55— and —55'— being just sufficient to permit the operation of the lever —40— in the manner just described from breaking the connection between the unit spindle —u— of the meter and the drum —2— thereby temporarily stopping the feed of the record sheet during the printing and cutting operation following which the hand crank —29— and shaft —26— together with the crank arm —37— and parts carried thereby will be restored to their starting position.

During this initial rotary movement of the cam shaft —26— from a starting position and while the pawl —57— is still registered with the recess —54— the engagement of the pawl —56— with the ratchet wheel will rotate said ratchet wheel through a partial revolution equal to the length of the recess —54— for winding the spring motor —45— and thereby to at least partially compensate for the unwinding of said motor in driving the drum —2— in the manner previously described.

At each operation of the printing and cutting mechanism suitable symbols as the dollar signs ($) are printed adjacent the total prices for the total commodity measured by the meter and at about the same time the bill section —a'— is cut from the sheet, but during the upward return of the printing and cutting element —21— the section —a'— will be lifted from the sheet and released from such lifting movement by stripped fingers —58—, Figure 5, thereby permitting the detached section —a'— to slide down the inclined face of the sheet adjacent the platen into the case from which it may be removed by the operator and presented to the patron to be submitted to the service company for payment at which time a portion as —a"— of the section constituting a stub is detached therefrom to be retained in the files of the company while the remaining portion is returned to the patron as evidence of payment of the bill according to the price indicated by the dollar marks.

While the member —21— is moved to its printing and cutting position the sliding pawl —32—, Figure 9, will be forced into holding engagement with the teeth of the star wheel —31— to properly aline the proper spaces on the sheet indicating the totals with the corresponding printing and cutting elements on the member —21— and at the same time, it will be remembered, the drum —2— will be disconnected from the meter spindle —u— by the disengagement of the pawl —20— from the ratchet wheel —19— in the manner previously described, said pawl —32— being returned to its normal position out of engagement with the star wheel —31— with the return of the hand crank —29— to its starting position leaving the clutch operating lever —40— in its clutch releasing position to which it was forced by the initial movement of the crank arm —29—.

It is now evident that under these conditions the drums —2— and —4— carrying the record sheet are free for operation by the spring motor —45— independently of the meter for feeding the sheet and that this forward feeding movement of the sheet would be comparatively rapid and would be continued until the spring motor spends its force unless stopped by some suitable restraining means but in actual operation automatic means is provided for stopping the feed of the sheet after it has been moved a sufficient distance to displace its cut-away portion from the printing and cutting elements or until succeeding columns of quantity and price figures have been brought to starting position for recording the succeeding months total consumption and cost.

For this latter purpose the record sheet is provided with apertures —59— arranged in longitudinally spaced relation along the sheet at the outside of the portions which are to be cut out for billing purposes as shown in Fig. 2 and also in definite relation to the beginning of each set of monthly columns of figures, for receiving the free end of a stop pawl —60—, Figures 1 and 8.

This pawl together with a tripping pawl —61— are secured to a rock shaft —62— carrying a crank arm —63— which is connected by a link —64— to one arm of a bell crank lever —65—, Figures 6 and 8, the latter being mounted upon a portion of the main frame —1— adjacent the cam end of the lever —40—.

The drum —4— is provided with an annular groove —66— with which the openings —59— in the record sheet are alined and in this annular groove is loosely journaled a ratchet wheel —67—, concentric with the axis of the drum —4—.

This ratchet wheel is provided with an axially extending pin —68— (Figures 3 and 6) at one side of its axis and normally engaged by opposed spring arms —69— which are secured to a post —70— on the adjacent portion of the drum but at the opposite side of the axis of the ratchet wheel —67— to establish a yielding connection between the ratchet wheel and drum.

When the sheet is being advanced by the spring motor following the printing operation the free end of the pawl —60— trails upon the imperforate portion of the sheet until the nearest aperture —59— in the sheet registers with the free end of the pawl at which time the pawl —60— will pass through the registering aperture —59— and engage the teeth of the ratchet wheel —67— to stop the further movement of the sheet by the spring motor with the assurance that the starting points of the columns of figures for the next succeeding months will be in proper position to begin the record for the consumption and price of the commodity for that month.

The cutting knives —25— are arranged to cut out a billing portion of the sheet of predetermined length, in this instance, nineteen spaces, three of which form the stub —a″— to be retained in the files of the service company while the remainder forms the bill section —a′— to be retained by the patron when the bill is paid.

The dollar characters on the printing couple are arranged to print one $ sign on the stub —a″—, another on the billing section —a′— and a third on the sheet preferably in the first line following the cut away billing section as shown in Figure 2.

When the bill section —a′— is detached from the sheet and slightly elevated by friction with the knives —25—, it is removed from the knives by the fingers —58— and then slides down the inclined platen into a chute —1′— which extends to the outside of the case and from which it may be removed by hand if desired.

The sheet is preferably provided with three similar columns —e′— of prices for each monthly period corresponding to the number of records to be made and in order that the same price totals may appear in each record, one in the stub —a″—, another in the billing section —a′— and a third on the sheet the price columns of each monthly group are arranged in lengthwise staggered relation as shown in Figure 2.

For example, if, at the time the employee of the service company operates the printing and cutting device of the recording and billing attachment of any meter, say No. 746 and the price columns on the sheet show the price as $2.10 of the total commodity passed through that particular meter since the last record, the same total price in the several price columns will be indicated by $ signs impressed, one on the stub —a″—, another on the billing section —a′— and another on the sheet adjacent the billing section, these characters being impressed upon the sheet in the manner described at the same time that the sections —a′— and —a″— are cut therefrom.

*Operation*

Now with the printing elements in their normal positions the sheet will be moved lengthwise in the direction indicated by the arrows, Figures 1 and 2, in synchronism with the operation of the meter.

This feeding operation of the sheet will progress as long as the commodity to be measured is passing through the meter so that the total amount of said commodity and the price thereof registering with the $ marks on the printing couple will indicate the total amount and price of the commodity consumed.

At the end of any such period of, say, one month from the beginning of the operation of the sheet, the employee of the service company may operate the cutting and the printing couple to cut out the registering section of the sheet by simply turning the hand crank —29— one complete revolution, by which operation the $ marks are impressed upon the cut out section and remaining portion of the sheet in the manner previously described, ready for a repetition of the operation of the sheet for the next month's recording and billing.

During this cutting and printing operation the sheet feeding mechanism is temporarily stopped and disconnected from the meter in the manner previously described.

Immediately following the return of the printing and cutting mechanisms to their normal starting positions and while the meter is still disconnected from the feeding mechanism said feeding mechanism will be operated by the spring motor —45— to feed the sheet forwardly a sufficient distance to register the beginning of the next succeeding column —e— and its companion price column —e— with the portion of the printing couple bearing the $ sign for impression on the stub —a″— of the next succeeding bill at which time one of the apertures —59— in the sheet will register with the free end of the pawl —60— allowing the latter to drop through the aperture into engagement with the ratchet wheel —47— for temporarily stopping the further feed of the sheet by the motor —45—.

This dropping of the pawl —60— through the aperture —59— allows the controlling pawl —61— to drop against the adjacent sprocket teeth —74'— and also allows the arm —63—, and link —64— to drop a corresponding distance for operating the bell crank lever —65— and thereby restoring the lever —40— and clutch collar —42— to their normal starting positions which permits the pawl —20— to re-engage the ratchet wheel —19— and thereby to re-establish connection of the feeding mechanism with the meter spindle —u—.

The combined driving power of the meter —u— and spring motor —45— causes a slight turning movement of the drum —4— relatively to the ratchet wheel —67— which is then being held by the pawl —60— but this slight movement of the drum against the action of the spring arms —69— causes the teeth —14'— of the drum to engage and force the pawl —61— outwardly thereby tripping the pawl —60— and permitting the free forward feeding operation of the record sheet thus completing the cycle of operation for one monthly period.

What I claim is:

1. In a recording and billing attachment for meters, a record sheet bearing a column of numerals progressively increasing in values from one end, meter-actuated means for feeding the sheet in the direction of length of said column, and a spring motor operatively connected to said feeding means to assist the meter in driving the same.

2. In a recording and billing attachment for meters, a record sheet bearing a plurality of columns of figures, said columns being arranged in sequence and each column having its figures progressively increasing in value from one end, meter-actuated means for feeding the sheet in the direction of length of said columns, and means operable at will for stamping out portions of the sheets bearing the columns when presented to a fixed line during the travel of the sheet.

3. In a recording and billing attachment for meters, a record sheet bearing successive columns of figures in progressively increasing values, means operable at will for making impressions upon the record sheet, means for feeding the sheet relatively to said impression making means in synchronism with a movable part of the meter, and sheet-controlled means for automatically stopping the sheet-feeding means as the beginning of each column of figures assumes a definite position with relation to the impression-making means.

4. In a recording and billing attachment for meters, a printing couple, a record sheet movable between the printing couple, means for feeding the sheet in synchronism with one of the movable parts of the meter, means operable at will for operating the printing couple to make an impression on the sheet and means actuated by a part of the impression making means for stopping the sheet feeding means while the impression is being made.

5. In a recording and billing attachment for meters, a record sheet, means operable at will for cutting out portions of the record sheet, means for feeding the sheet to the cutting means in synchronism with one of the moving parts of the meter, and means actuated by a moving part of the cutting means for stopping the sheet feeding means during the cutting operation.

In witness whereof I have hereunto set my hand this 17th day of February, 1926.

WILLIAM B. BETTS.